Jan. 19, 1943.   C. F. MEINZER   2,308,769
METHOD AND APPARATUS FOR FORMING GRANULATED SLAG
Filed Jan. 21, 1941   3 Sheets-Sheet 1

Inventor:
Carl F. Meinzer
By Lee J. Davis
Attorney

Jan. 19, 1943.    C. F. MEINZER    2,308,769
METHOD AND APPARATUS FOR FORMING GRANULATED SLAG
Filed Jan. 21, 1941    3 Sheets—Sheet 2

Inventor:
Carl F. Meinzer
By Lee J. Gary
Attorney

Inventor:
Carl F. Meinzer
By Lee J. Gary
Attorney.

Patented Jan. 19, 1943

2,308,769

UNITED STATES PATENT OFFICE 2,308,769

METHOD AND APPARATUS FOR FORMING GRANULATED SLAG

Carl F. Meinzer, Brighton, Ala., assignor to Wallace L. Caldwell, Birmingham, Ala.

Application January 21, 1941, Serial No. 375,117

11 Claims. (Cl. 83—91)

This application is a continuation-in-part of my co-pending application Serial No. 253,507 filed January 30, 1939, and relates to novel apparatus for treating and disintegrating blast furnace slag, electric furnace slag, or other molten slag-like material, and to the method of producing thereby dry granulated slag of suitable nature for cement manufacture.

The general method of adding water to molten slag to form granulated slag is well known, and likewise various specific apparatus and methods have been employed to incorporate water and/or steam with liquid slag in order to disintegrate the slag and produce cellular pellets or particles.

It is an object of the present invention to provide an improved apparatus for the treatment and disintegration of molten slag whereby a uniform and continuous stream of slag is first brought into contact with a jet of water under pressure to reduce it to a non-coherent stream, thereafter subjected to violent mechanical agitation and centrifugal force, and then ejected into the air at a high velocity in the form of cellular pellets or particles.

It is a further object of this invention to provide a method for the granulation of liquid slag in the form of finely divided cellular particles by means of the within apparatus, and to form a chemically active material suitable for cement manufacture.

Another object is to provide a method and apparatus for the production of granulated slag suitable for cement manufacture having an extremely low moisture content or one which is substantially free of moisture, with the result that it may be more economically transported and thereafter ground for the purpose of cement manufacture without the necessity for drying and without added labor and expense.

As more particularly set forth in my aforesaid co-pending application, the apparatus generally shown and described herein, when combined with pellet accumulation means, such as an open receptable opening into the high velocity pellet stream issuing from the disintegrator and positioned sufficiently close thereto to arrest the flight of the pellets while they still contain sufficient heat to cumulatively build up and agglomerate them therein, is thereby adapted to form enlarged unitary cellular bodies of tough light weight cellular slag suitable for use as light weight aggregate.

The present invention, however, is directed more particularly to the aforesaid slag disintegrating apparatus, whether used alone or in combination with the aforesaid agglomeration and mass formation means, and to the method of forming a substantially dry finely divided granulated slag by means of said disintegrating apparatus alone or collecting the material as it issues therefrom without the agglomerating means and method.

Other objects relate to various details of construction, arrangement of parts, detailed steps of operation, and economies thereof, which will be apparent from a consideration of the following specification and drawings wherein.

Figure 1:
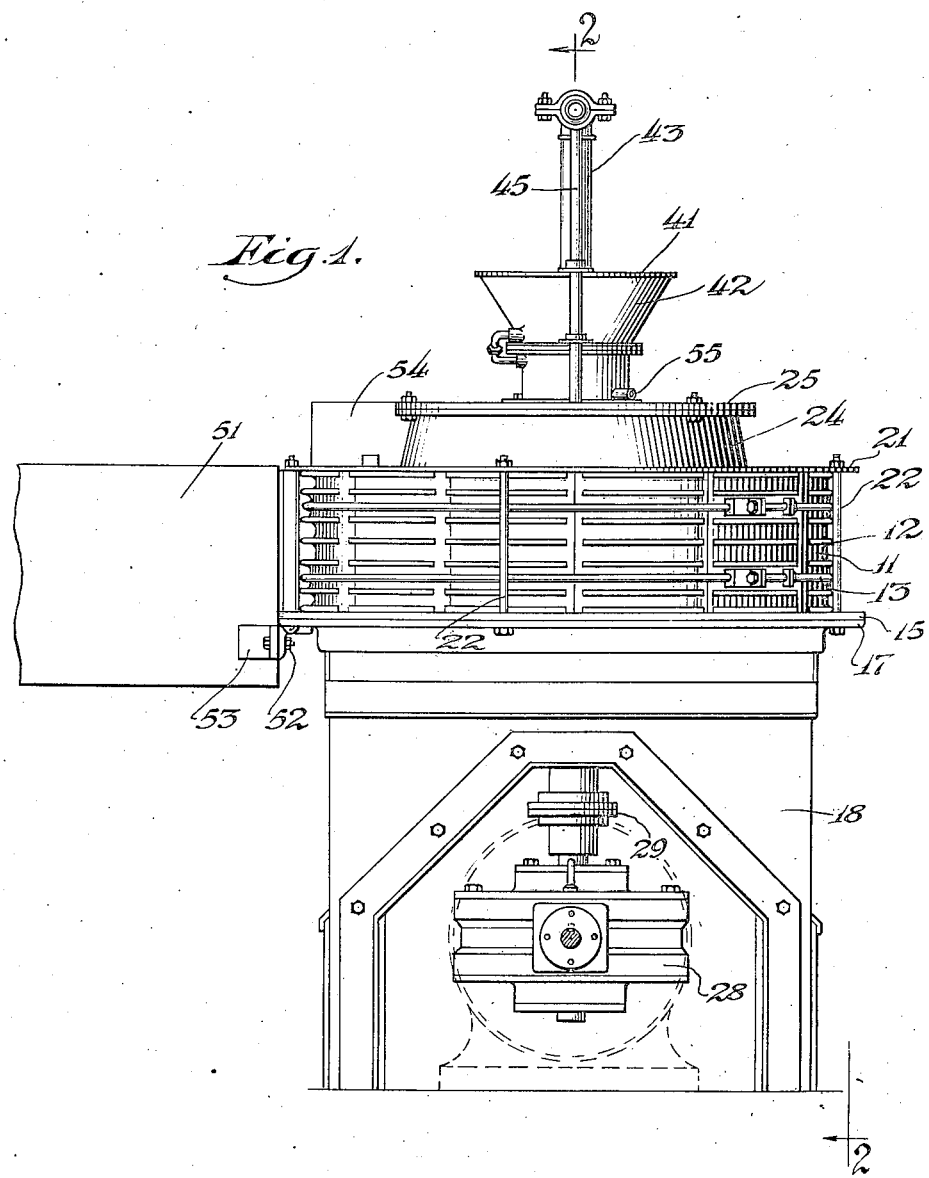
Fig. 1 is a side elevational view of my liquid slag disintegrating apparatus.
Figure 2:
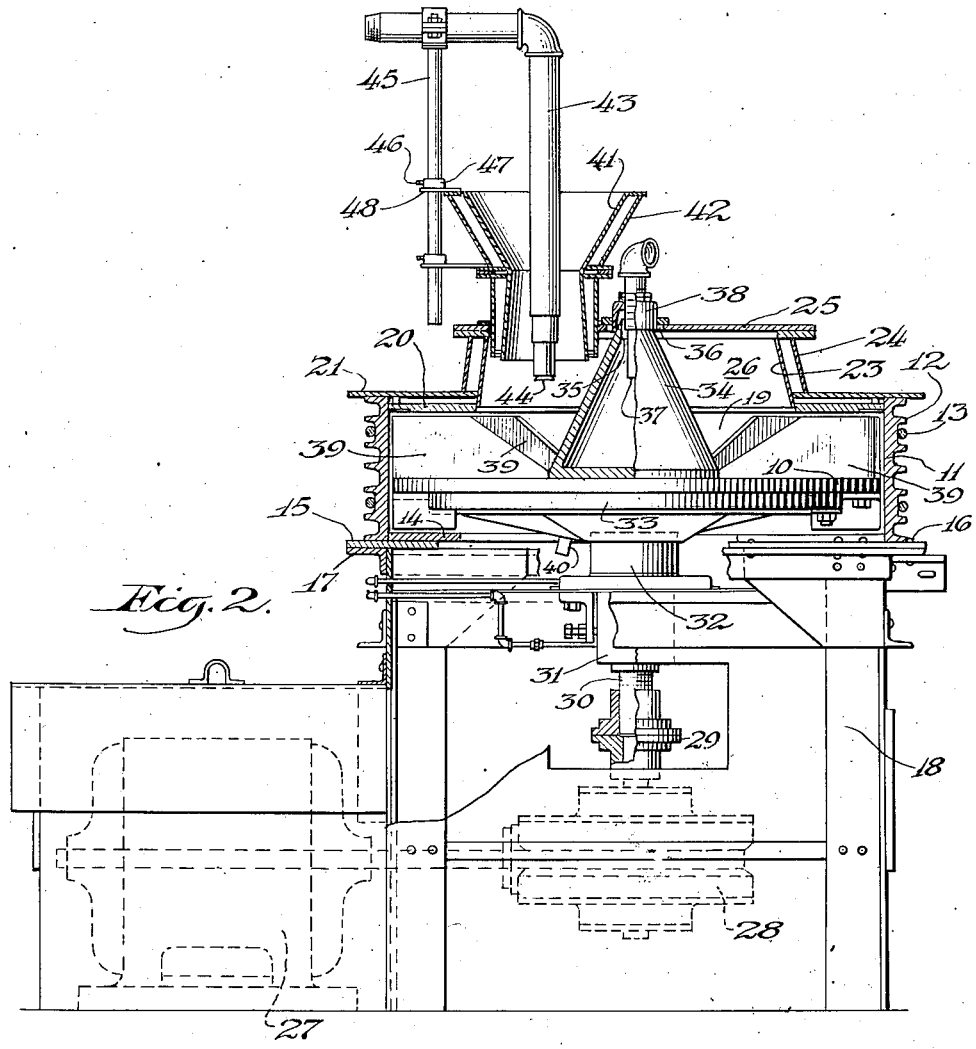
Fig. 2 is a partial section on the line 2—2 of Fig. 1.
Figure 3:
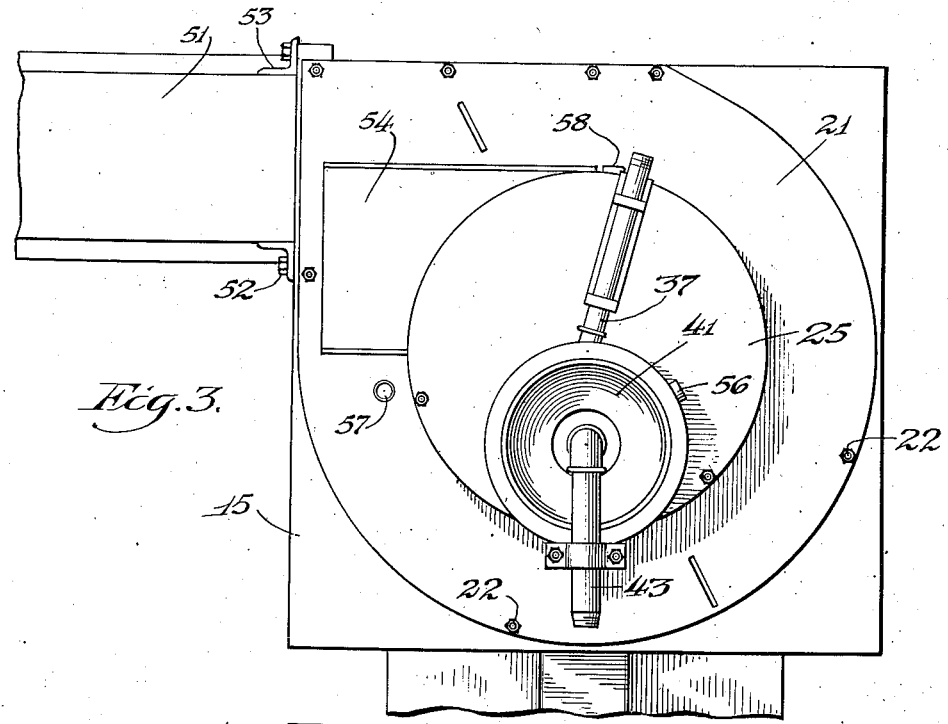
Fig. 3 is a plan view of the apparatus shown in Fig. 1.
Figure 4:
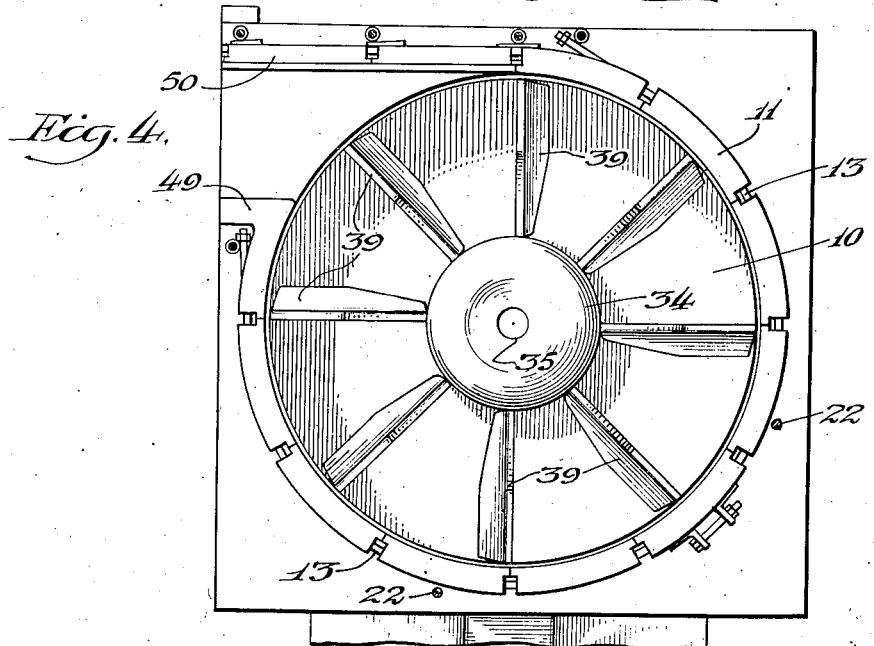
Fig. 4 is a plan view similar to Fig. 3 with the cover plate 20 and details of equipment thereabove removed.

In general my invention relates to the introduction of liquid slag to the chamber of my disintegrating apparatus in the form of a substantially round or oval stream and at a substantially constant rate and quantity of flow. Water for the purpose of assisting in the disintegration of the slag is likewise introduced at a constant rate in relation to the flow of the slag, and in limited and controlled quantity. As the slag stream enters the chamber it is contacted with a jet of water under pressure which reduces the slag to a non-coherent state, after which it drops to a turntable within the chamber rotating at a speed of from about 400 to 800 revolutions per minute and with a peripheral speed of from about 50 to 133 feet per second. The turntable is provided with a series of radial vanes which shear the introduced slag stream at right angles and violently agitates it within the chamber wherein by means of the mechanical agitation, centrifugal force, and moisture, the slag becomes finely divided into the form of cellular particles or pellets, and is thereafter ejected at a high velocity into the air in a confined stream.

In accordance with the method of the present invention, this particle stream of granulated slag without further treatment after being cooled in the air is permitted to drop onto a conveyor or collected by other means such as a deflector plate after its velocity is considerably reduced. Material may thus be formed and collected with a moisture content of from approximately 0 to 1%, and commercially produced with a moisture content of from about 0% to about 3%, and thus may be shipped without incurring the expense of shipping water, and ground for cement manufacture without the expense and labor of predrying.

Referring to the drawings, my liquid slag granulating or disintegrating apparatus comprises in general, a turntable or rotor element 10 surrounded by the wall 11. This wall is preferably formed of sections of "Ni-Hard" cast iron, that is, nickel-chromium abrasion-resistant iron, or other abrasion resistant material and provided with heat radiating fins 12, the sections being bound together by means such as the clamp rings 13. Below the rotor 10 and spaced therefrom is the closure plate 14, the said plate 14 and the base of the wall 11 resting on the bed plate 15. This bed plate 15 may suitably be riveted as at 16 to the flange 17 of the mounting base generally indicated as 18. Above the rotor 10 and generally defining therewith the main chamber or bowl 19, are the annular cover plates 20 and 21 spaced from each other to provide a chamber for their water cooling. The cover plate 21 is retained over the wall 11 by a plurality of bolt means 22 extending therethrough from the flange 17 and bed plate 15, and whereby the cover plates may be removed for access to the bowl when desired. Rising from the inner peripheries of the cover plates 20, 21, is the wall 23, provided with a water jacket 24, and cover plate 25, this cover plate and wall 23 defining generally a relief chamber 26.

For the actuation of the rotor 10 suitable drive means are provided such as the motor 27 and its speed reducer 28. Connected to the speed reducer through the coupling 29 is the axial drive shaft 30 journaled in the main bearing 31 and pilot bearings 32, and engaged through the bearing plate 33 to the rotor 10, by suitable connecting means.

Positioned centrally on and secured to the rotor 10 is the hollow deflector cone 34, truncated adjacent its apex 35 whereat it extends to the aperture 36 in the cover plate 25. A water inlet tube 37 extends into the cone 34 through its truncated apex, which is of slightly greater diameter than the tube, whereby water first admitted to the cone for the purpose of cooling it can thereafter flow outwardly. To regulate the degree of this outward flow from the cone a variable overflow nozzle 38 is provided which can be raised or lowered in relation to the cone surface and whereby the jet of water issuing therethrough may be controlled.

The rotor 10 is additionally provided with a plurality of radial vanes 39 suitably secured thereto, spaced at equal angles to each other. These vanes, preferably as shown, extend from the periphery of the rotor 10 and closely adjacent the wall 11 substantially to the height of the annular cover plate 20 and taper downwardly from approximately the inner periphery of plate 20 to the base of cone 34. These vanes 39 are preferably formed of a suitable alloy steel to resist abrasion and heat and may if desired be provided with internal water cooling means to cool the metal thereof through a centrifugal pressure system, not fully shown herein, for example, water may be supplied from cone 34 through a plurality of apertures in the base thereof communicating through rotor 10 with a chamber in the top of the bearing plate 33, thence upwardly through apertures extending through the rotor 10 into hollows in the body of the vanes 39, and thence outward through other apertures extending through rotor 10 and base plate 33 to be discharged from a plurality of conduits such as the one indicated at 40, and such an arrangement may thus also supply or provide cooling water for the rotor 10 and the base plate 33.

Positioned on the cover plate 25 and extending through it and spaced from its axis is a funnel 41, for admitting slag to the rotor 10 at a point well out from the axis thereof. The funnel 41 may be provided with a suitable water jacket 42 for cooling the metal thereof. Extending preferably axially of the funnel 41 is the water supply conduit 43 terminating in the nozzle 44. This nozzle 44 preferably opens below the lower terminus of the funnel and is adapted to deliver a jet of water in a direction downwardly and at an angle outwardly. The position of the nozzle 44 may be adjusted vertically by means of the support 45 engaged to the conduit 43 and the set screws 46 and collars 47 mounted on the ledges 48.

Extending outwardly from the wall 11 and opening into the main bowl 19 is a tangential main discharge path defined laterally by the sides 49 and 50, side 50 of which extends substantially tangentially from the periphery of the rotor 10 in the direction of its rotation, and merges with the enclosure wall 11. The opposed side 49 is substantially parallel to the side 50 and joins the opposed end of wall 11, the sides 49 and 50 being spaced apart a distance substantially equal to the width of the effective area of the vanes 39. Top and bottom closures for the discharge path sides 49 and 50 are provided by an extension from the cover plate 21 and bed plate 15 respectively, suitably bolted together. To this discharge path formed by the side portions 49 and 50 and top and bottom portions 21 and 15, is secured the discharge chute 51, by suitable bolts 52 and angle means 53. If desired, a similar tangential relief path or chute, diagrammatically indicated at 54 may be additionally provided, opening from the relief chamber or bowl portion 26. This relief chute would, however, remain closed in normal operation of the apparatus, and only be utilized for purposes of safety or relief of abnormal congestion or other conditions in the apparatus as a whole.

As previously set forth, the wall 11 is formed of an abrasion resistant metal provided with radiation fins. If desired, a water cooling jacket could be utilized with an inferior grade of metal to prevent warping thereof under the high heat encountered, or the wall 11 could be formed of refractory brick except that it would wear more than steel or iron. Thus it will be understood in the hereinafter set forth operation of my apparatus that the utilization of a heat radiating wall construction 11, or water cooling thereof is carried out solely for the maintenance of the metal parts and not for the purpose of effecting the general operation of the apparatus or the size or rate of cooling of the product. In a like manner the water inlet 55 and water outlet 56 is for the sole purpose of cooling the metal of the funnel 41, and the water inlet 57 and outlet 58 is for the sole purpose of cooling the cover 20 and relief bowl wall 23, and although not shown, other water jackets and means of circulating cooling fluid for the metal parts may be provided.

In the general operation of my slag disintegrating apparatus liquid slag is introduced by means of a suitable runner into the funnel 41 in a continuous stream and at a constant rate and descends therethrough perpendicular to the rotor 10, in the form of a substantially round or oval stream, induced thereto by the funnel and/or a semi-circular shaped runner as distinguished from the use of thin streams of slag in certain types of prior art processes and apparatus. As the coherent stream of slag leaves the funnel and well before the stream reaches the disintegrating vanes 39 or rotor 10, a jet of water under high pressure, in limited and controlled amount in relation to the flow of the slag, issues from the nozzle 44 angularly to the slag stream. This action of the water at this point serves to reduce the slag to a somewhat non-coherent state after which it descends to the bowl 19 of the apparatus in a still constant but non-coherent stream.

As this non-coherent stream enters the bowl 19 perpendicularly to the rotor 10, it is met with the shearing action of the vanes 39 rotating at a high velocity, and well out from the center of the rotor 10, where it is subject to much more violent action than if it were delivered at the relatively slow moving center. Additional amounts of water under high pressure, likewise controlled and correlated to the rate of flow and quantity of slag and the water introduced at nozzle 44, are introduced by means of the cone nozzle 38. A portion of the water supply under the added impetus of the centrifugal action of the cone impinges against the slag stream in its descent to the vanes and rotor.

As previously indicated, the rotor is operated at a high speed, on the order of 400 to 800 revolutions per minute, and with rotor diameters of from about 30 to 54 inches there are obtained peripheral speeds of from about 5000 to 8000 feet per minute which are preferred, although operation may be carried out as low as 3000 feet per minute. Thus as the already water treated non-coherent slag stream descends to the rotor 10 it is impelled outwardly to the wall 11 under the full action of the rotor which gives the slag particles high angular velocity and under the full and large effective area of the vanes which give them direction. Although the slag particles remain within the bowl of the machine for a relatively short period and travel therein a distance of about 6 or 7 feet, yet the violent mechanical agitation and high centrifugal force, together with water introduced to the slag and to the bowl of the apparatus and the steam formed therein is sufficient to complete the disintegration and expansion of the slag in a relatively confined space and with maximum utilization of a limited amount of water.

The pellets or particles of granulated slag thereafter leave the bowl 19 at a high linear velocity imparted to them in a straight horizontal line through the discharge path and chute 51 and into the air. In the absence of the combination of the within apparatus with back-stop means as disclosed in my aforesaid co-pending application, and when it is desired to recover the product of the herein described apparatus per se, the particles of finely divided slag are permitted to drop into a bin or conveyor, by the aid of, if desired, a flat plate or surface interposed at an angle to the issuing stream for the purpose of deflecting and collecting the particles, after they have travelled in the air for a considerable distance and have become rapidly cooled thereby. This results in the production of friable puffed cellular slag particles which have hydraulic properties when ground for use in cement manufacture, and as previously stated, in this manner material is produced having the extremely low moisture content of from about 0% to about 1%, or commercially from about 0% to about 3%, with the aforementioned attendant advantages.

It will be understood from the foregoing that various detailed parts and arrangements thereof may be modified without departing from the spirit of my invention, for example, additional jets of water by various nozzle means may be utilized and positioned for reducing the continuous round or oval shaped stream of molten slag as it enters the bowl of my apparatus to a non-coherent state prior to its being acted upon by the mechanical disintegrating means.

I claim as my invention:

1. In an apparatus of the class described a disc having radial vanes thereon, a peripheral wall surrounding said disc and closely fitting the periphery of said disc, means for rotating said disc, means for delivering a stream of molten slag in substantially cylindrical form perpendicular to said disc, jet means for delivering a stream of water into the path of said slag stream to said disc in controlled and regulated amounts to reduce the coherency of said molten slag and to assist in the formation of cellular particles or pellets, said wall having an opening therein, a conduit extending from said opening tangentially from said disc, the said disc and vanes thereon being adapted to further disintegrate said water treated slag to convert it into the form of cellular particles or pellets and to discharge a stream of said cellular pellets through said opening and said conduit at a high velocity.

2. Apparatus for producing cellular slag particles from molten slag, which comprises a disc having radial vanes thereon extending to the periphery thereof, a chamber having a peripheral wall surrounding and closely fitting the periphery of said disc, means for rotating said disc, means for delivering a stream of molten slag to said disc perpendicular to the surface thereof, means for impinging water against said slag stream in its said path to the disc, said wall having an opening therein, and a conduit having a width substantially equal to the width of the effective area of one of said vanes extending from said opening tangentially from said disc, the said disc being adapted to form and discharge a stream of said pellets outwardly of said chamber at a relatively high linear velocity through said opening and said conduit.

3. Apparatus for producing cellular slag particles from molten slag, which comprises, a disc, means for rotating said disc, a peripheral wall closely surrounding and fitting the periphery of said disc and a top closure defining a chamber therewith, a plurality of radial vanes on said disc having outer end portions filling the cross-sectional area of said chamber from said periphery to a point inwardly thereof and converging to adjacent the axis of said disc, inlet means in said top closure for delivering a stream of slag perpendicularly to said disc spaced from its axis, nozzle means for impinging a limited and controlled amount of water under pressure angularly against said slag stream to reduce it to a non-coherent stream while passing to said disc, and a conduit extending from an opening in said wall tangentially of said disc, the said disc and vanes thereon being adapted to form and control a stream of slag pellets and to discharge them outwardly of said chamber at a relatively high velocity through said opening and said conduit.

4. Apparatus for producing cellular slag particles from molten slag, which comprises, a disc, means for rotating said disc, a peripheral wall closely surrounding and fitting the periphery of said disc and a top closure defining a chamber therewith, a plurality of radial vanes on said disc having outer end portions filling the cross-sectional area of said chamber from said periphery to a point inwardly thereof and converging to the base of a deflector cone positioned axially of said disc, an inlet funnel extending through said top closure for delivering a stream of slag perpendicularly to said disc spaced from its axis, nozzle means in said chamber adjacent the base of said funnel and nozzle means adjacent the apex of said cone for impinging a limited and controlled amount of water under pressure angularly against said slag stream to reduce it to a non-coherent stream while passing to said disc, and a conduit extending from an opening in said wall tangentially of said disc, the said disc and vanes thereon being adapted to form and control a stream of slag pellets and to discharge them outwardly of said chamber at a relatively high velocity through said opening and said conduit.

5. Apparatus for producing cellular slag particles from molten slag, which comprises, a cylindrical disintegrating chamber having inlet means in the top of said chamber and spaced from the axis thereof for introducing a vertical substantially round cross-sectional stream of slag, means for impinging water under pressure at a downward angle against said stream in a limited amount controlled in relation to the stream of slag to reduce it to a substantially non-coherent stream, and centrifugal means for further disintegrating said slag in the presence of introduced moisture and impelling said slag in the form of pellets or particles outwardly into the air at a high linear velocity through peripheral conduit means extending tangentially from said chamber, the said centrifugal means comprising a horizontal disc extending to the cylindrical wall of said chamber, means for rotating said disc, a plurality of radial vanes on said disc having end portions extending from said wall and the chamber top thereat and tapering from a point inwardly of the wall to the base of a deflector cone positioned axially on said disc.

6. Apparatus for producing cellular slag particle from molten slag, which comprises, slag supply means for forming a substantially vertically falling stream of slag, means for impinging a limited amount of water against said stream sufficient to reduce the coherency of said slag, centrifugal means including a rotor for receiving and disintegrating the resulting slag into pellets of cellular slag and imparting a high substantially uniform velocity to said pellets, a casing for said rotor provided with a discharge conduit positioned substantially tangentially of said rotor for discharging a stream of said pellets and peripherally confining said stream during said discharge to direct said pellets into a stream of relatively narrow cross-section composed of separated pellets freely moving at said high velocity through an elongated path of relatively cool air to rapidly and substantially uniformly cool said pellets, said conduit being spaced circumferentially of said rotor from said slag supply means sufficient to provide for said disintegration of said slag into said pellets of cellular slag.

7. Apparatus for producing cellular slag particle from molten slag, which comprises, slag supply means for forming a substantially vertically falling substantially round cross sectional stream of slag, means for impinging a limited amount of water against said stream sufficient to reduce the coherency of said slag, centrifugal means including a rotor for receiving and disintegrating the resulting slag into pellets of cellular slag and imparting a high substantially uniform velocity to said pellets, a casing for said rotor provided with a discharge conduit positioned substantially tangentially of said rotor for discharging a stream of said pellets and peripherally confining said stream during said discharge, said conduit being of sufficient length and sufficiently small in cross section to direct said pellets into a stream of relatively narrow cross section composed of separated pellets freely moving at said high velocity through an elongated path of relatively cool air to rapidly and substantially uniformly cool said pellets, said conduit being spaced circumferentially of said rotor from said slag supply means sufficient to provide for said disintegration of said slag into said pellets of cellular slag.

8. Apparatus for producing cellular slag particle from molten slag, which comprises, slag supply means for forming a substantially vertically falling stream of slag, means for impinging a limited amount of water against said stream sufficient to reduce the coherency of said slag, centrifugal means including a rotor for receiving and disintegrating the resulting slag into pellets of cellular slag and imparting a high substantially uniform velocity to said pellets, a casing surrounding and closely fitting said rotor and provided with a discharge conduit positioned substantially tangentially of said rotor for discharging a stream of said pellets and peripherally confining said stream during said discharge to direct said pellets into a stream of relatively narrow cross section composed of separated pellets freely moving at said high velocity through an elongated path of relatively cool air to rapidly and substantially uniformly cool said pellets, said conduit being spaced circumferentially at least a major portion of the circumference of said rotor from said slag supply means to provide for said disintegration of said slag into said pellets of cellular slag.

9. The method of forming particle of substantially dry cellular slag from molten slag, which comprises, forming a substantially vertically descending stream of said molten slag, distributing a limited amount of water in said slag by impinging said water against said stream in sufficient amount to reduce the coherency of said slag, immediately thereafter subjecting the resulting slag to violent centriufgal mechanical agitation for sufficient time to disintegrate said resulting slag into pellets of cellular slag, discharging the resulting pellets by centrifugally projecting the same in a stream at a high substantially uniform velocity through an elongated path of relatively cool air, and peripherally confining said stream during said discharge to direct said resulting pellets into a stream of relatively narrow cross section composed of separated pellets freely moving at said high velocity through said air to substantially uniformly cool said pellets.

10. The method of forming particle of substantially dry cellular slag from molten slag, which comprises, forming a substantially vertically descending stream of said molten slag having a substantially constant rate of flow, distributing a limited amount of water in said slag by impinging said water under pressure against said stream at a substantially constant controlled rate and in sufficient amount to reduce the coherency of said slag, immediately thereafter subjecting the resulting slag to violent centrifugal mechanical agitation for sufficient time to disintegrate said resulting slag into pellets of cellular slag, discharging the resulting pellets by centrifugally projecting the same in a stream at a high substantially uniform velocity through an elongated path of relatively cool air, and peripherally confining said stream during said discharge to direct said resulting pellets into a stream of relatively narrow cross section composed of separated pellets freely moving at said high velocity through said air to substantially uniformly cool said pellets.

11. The method of forming particle of substantially dry cellular slag from molten slag, which comprises, forming a substantially vertically descending stream of said molten slag having a substantially constant rate of flow, distributing a limited amount of water in said slag by impinging said water under pressure against said stream at a substantially constant controlled rate and in sufficient amount to reduce the coherency of said slag, immediately thereafter shearing small sections of slag from said stream and subjecting the resulting slag to violent centrifugal mechanical agitation for sufficient time to disintegrate said resulting slag into pellets of cellular slag, discharging the resulting pellets by centrifugally projecting the same in a stream at a high substantially uniform velocity through an elongated path of relatively cool air, and peripherally confining said stream during said discharge to direct said resulting pellets into a stream of relatively narrow cross section composed of separated pellets freely moving at said high velocity through said air to substantially uniformly cool and dry said pellets, and collecting the resultant substantially dry air cooled particles.

CARL F. MEINZER.